Nov. 13, 1962  D. J. ROTIER  3,063,662
AUTOMATIC FLIGHT CONTROL APPARATUS FOR AIRCRAFT
Filed Dec. 31, 1959  3 Sheets-Sheet 1

INVENTOR.
DONALD J. ROTIER
BY Gordon Reed

Nov. 13, 1962 D. J. ROTIER 3,063,662
AUTOMATIC FLIGHT CONTROL APPARATUS FOR AIRCRAFT
Filed Dec. 31, 1959 3 Sheets-Sheet 2

INVENTOR.
DONALD J. ROTIER
BY *Gordon Reed*

# United States Patent Office 3,063,662
Patented Nov. 13, 1962

3,063,662
AUTOMATIC FLIGHT CONTROL APPARATUS FOR AIRCRAFT
Donald J. Rotier, Minneapolis, Minn., assignor to Minneapolis-Honeywell Regulator Company, Minneapolis, Minn., a corporation of Delaware
Filed Dec. 31, 1959, Ser. No. 863,331
17 Claims. (Cl. 244—77)

This invention relates to control apparatus for an aircraft such as apparatus that operates control surfaces of the aircraft for changing its angular position about one or more axes thereof while in flight. More particularly, this invention relates to flight control apparatus for an aircraft utilizing a command signal limiting arrangement similar to that shown in my prior application, Serial No. 772,316, filed November 6, 1958.

In such combination of flight control apparatus and command signal limiter of my prior application, the command signal limiter tends to prevent the flight control apparatus from commanding aircraft surface rates that would result in normal G-loads on the craft, i.e. forces in the direction of its Z axis above a preset value or angles of attack of the aircraft in excess of a limit previously set. If a command input signal through the flight control apparatus to the servo operating the aircraft surface causes a surface operation which causes change in flight condition of the aircraft that is predicted to exceed a limit function the inputs controlling the servo are limited to the signal value that would result in the maximum preset G-load, for example. If the command signal to the flight control apparatus and thus to the servo drops to a value that would result in imposing less than the limit G on the aircraft, the flight control apparatus resumes normal command of the aircraft surface servo and the command signal is not limited but remains at full value.

With respect to the present invention, in some instances, the signals in the flight control apparatus may include an initiating signal that is supplied to the apparatus through a lag device such as a first order lag network. If such signal as lagged commands an aircraft surface rate that would result in normal G loads in excess of the preset value, the command signal limiter again limits the signal value that controls the aircraft surface servo.

When the magnitude of the initiating signal on the input side of the lag network decreases, it would be assumed that the flight control apparatus would immediately resume normal command of the aircraft surface servo, in other words, reduction of the initiating signal would result in reverse operation of the surface and consequent change in craft attitude in the reverse direction.

However, due to the stored or residual signal in the lag device, although the initiating signal to the lag network has decreased and the magnitude of the signal drops to a value that would result in imposing less than the limit G's or load factor on the craft, the signal from the output side of the lag device on the servoamplifier that controls the servo has not immediately decreased, consequently, the command signal limiter does not return the normal control of the aircraft surface servo to the control apparatus. In fact such normal control is not returned to the control apparatus until the signal from the lag device has decreased below a predetermined magnitude and this requires a period of time.

This condition wherein decrease in the initiating signal is not concurrently accompanied by operation of the control surface is referred to among pilots as a "command signal limiter hang-up" in that the command signal limiter in effect retains control of the aircraft surface servo when it would be expected ordinarily that the control apparatus would resume control of the servo.

The present invention is directed to correcting the "command signal limiter hang-up" condition. An embodiment of this invention is a variation of the "command signal limiter hang-up" corrector disclosed in a prior application of John T. Brands, Serial No. 841,783, filed September 23, 1959.

In the prior arrangement disclosed by Brands, a "command signal limiter hang-up" corrector took cognizance of but one lag device namely that related to an aircraft control stick force transducer and utilized contact type relays. In the present arrangement, the hang-up corrector compensates or takes cognizance of a plurality of individual signals having separate lag devices rather than but one signal and lag device.

A further object of this invention is to provide a "command signal limiter hang-up" corrector which dispenses with contact type relays.

A further object of this invention is to compensate for an input signal supplied through a lag device to condition control apparatus by including a second lag device in a feedback path in such apparatus so that interruptions in the normal control by said input signal of such apparatus may be subsequently restored without a noticeable delay.

A further object of this invention is to correct for a "command signal limiter hang-up" or time delay situation irrespective of the polarity of the control signal from the limiter i.e., irrespective of whether the craft has attained a positive or negative value of the limit function.

Other objects and advantages of this invention will be more readily realized by those skilled in the art upon reference to the following detailed description taken in conjunction with the accompanying drawings illustrating one embodiment of the invention.

Referring to the drawings.

Figure 1:
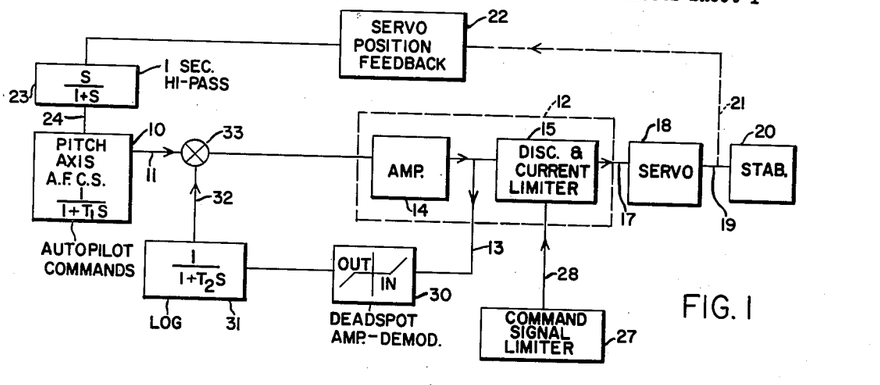
FIGURE 1 is a block diagram embodying the present inventive concept.

Reverting to FIGURE 1, which shows the invention applied for example to control of the aircraft about its pitch axis, an aircraft pitch axis automatic flight control system 10, wherein the servo is displaced in accordance with input signals, provides input control signals over a member 11 to an amplifier-discriminator device 12. The device 12 comprises a voltage amplifier section 14 and a voltage discriminator and current limiter section 15. The output of the discriminator section is applied through a transmission member 17 to operate a control valve of a hydraulic servomotor 18 that through its operating means 19 positions a control surface such as a stabilator 20 of an aircraft.

The operation of the servomotor 18 is also applied through a transmission member 21 to a servo position feedback signal generator 22 which supplies its signal through a high pass one second time constant network 23, having a transfer function $$\frac{TS}{1+TS}$$

which simplifies herein to $$\frac{S}{1+S}$$

when $T=1$, and thence through conducting member 24 to the pitch axis automatic flight control system. Included in the control system 10 are various devices for providing initiating control signal voltages such signal voltages being supplied in many instances individually through a lag network of the form $$\frac{1}{1+TS}$$

before being applied to the amplifier section 14.

The apparatus of FIGURE 1 includes a command signal limiter 27 which is similar to that disclosed in my prior application Serial No. 772,316, filed November 6, 1958. The command signal limiter 27 through its conducting member 28 applies in the present arrangement its control to the discriminator and command limiter section 15.

As more fully explained in my prior application, when the response of the aircraft due to factors affecting its flight are such that signals derived from such response when combined attain a limit function, no further increase in initiating signals from control apparatus 10 will effectively operate the servomotor 18 to further displace the stabilator 20.

Also, as described in the prior application of John T. Brands, Serial No. 841,783, the control signal from or out of a lag device, for example where the input to the lag device is the control stick steering signal derived from operation of the force applied to the control stick by the pilot, continues to increase; however, a signal such as derived from the operation of the servo which would balance such signal from the lag device no longer increases because of the action of the command signal limiter 27.

Consequently, while the input to the amplifier section 14 is generally substantially near balance in that the initiating and follow-up signals in normal operation are very nearly equal at all times, yet during control of the servo 18 from the command signal limiter 27 while the lag device output increases, the signal from operation of the servo that opposes the lag device output does not increase and such unbalance on amplifier 14 increases. If the signal provided into the lag circuit as by releasing the control stick now decreases, the lag circuit output actually does not immediately decrease, and the command signal limiter 27 thus retains control of the servo 18 beyond a desired instant.

To reduce the period that must elapse before decrease of stick force or opposite stick force is accompanied by reverse servo operation, I have provided a novel arrangement operating in a different manner from that in the aforesaid Brands application. In the present arrangement, I have additionally provided an amplifier-demodulator 30 having a substantially large "dead spot" or threshold on the input side so as not to be responsive to small differential voltages.

To indicate the "dead spot" on the amplifier 30 I have shown the input voltage thereto as abscissa and the output therefrom as ordinates with the input reaching a substantial magnitude before any output is obtained from the amplifier 30. While such amplifier-demoduator 30 may be connected to the input of amplifier section 14 to receive control voltages, I have shown it as connected on the output side of the amplifier section. It operates as follows, after the command signal limiter 27 in effect assumes control and the input to amplifier 14 attains an unbalance greater than that obtained in ordinary operation of the automatic control apparatus, the amplifier-demodulator 30 with its threshold exceeded by the large unbalance voltage, supplies a D.C. voltage signal to a lag device 31. The output of device 31 is transmitted through conducting member 32 to be summed with the output from the pitch axis control system 10. The time constant of the lag network 31 is substantially larger than the time constant of the lag circuit in the pitch axis control system 10, to be described.

It was stated above that an undesired period of control exists when the command signal limiter 27 continues to maintain control of the servo 18 and prevents control thereof from the discriminator 15 immediately upon decrease of the signal into the lag device of the control apparatus 10. This period that must elapse between decrease or reverse in the control signal into the lag device of apparatus 10 and return of control of the servo 18 to the discriminator 15 is referred to as stated as a command signal limiter hang-up. The amplifier 30 is referred to operationally as the hang-up amplifier, and FIGURE 2 comprises a graph which shows when the hang-up amplifier 30 begins to operate as well as the signal voltage supplied therefrom through lag device 31.

Figure 2:
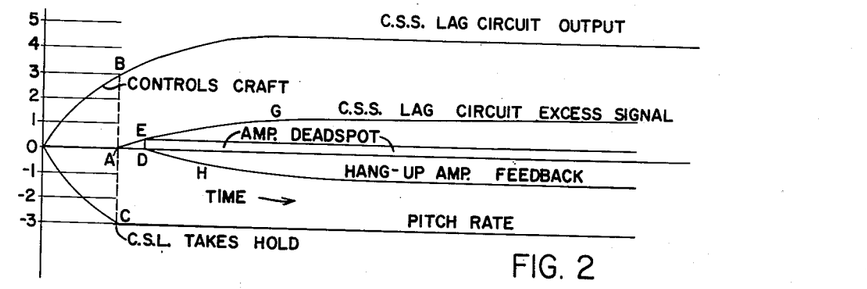
FIGURES 2 and 3 are graphs used in explanation of the "hang-up" correction arrangement.

For purposes of description and with reference to FIGURE 2, the control stick force transducer has been selected as the source of signal into a lag circuit, the output of such lag circuit being applied to the amplifier section 14. We may assume that the pilot of the aircraft applies a sudden force to the control stick so that the signal voltage developed by the transducer substantially follows the vertical ordinate of zero time and thus is a step signal. However, the output of the lag circuit which may be a resistor-capacitor type supplied by the pilot stick force signal does not follow this vertical line but builds up slowly with time to a maximum of 4.5 in the manner shown for the curve of the control stick signal lag circuit output FIGURE 2.

The aircraft responds to such control signal, and the aircraft flight condition sensor develops a signal opposing the command signal from the pilot controlled lag network. Ultimately when the control stick lag network output attains a value AB of 3.0 for example, the command signal limiter in response to an opposing signal A.C. FIGURE 2 developed by the flight sensor, in effect assumes control of further operation of servo 18. Such opposing signal termed a limit function may, for a simplified example, be developed by a pitch rate gyro.

The pitch rate limit function signal of FIGURE 2 now attains a constant value of 3.0 during control of the servo from the command signal limiter. However, the output from the lag circuit while the pilot exerts a force on the control stick, continues to increase to 4.5. The difference between the command signal from the control stick lag circuit and the now constant pitch rate signal results in an excess signal from the control stick signal lag circuit which excess signal is represented by curve AEG in FIGURE 2.

Ultimately this difference signal which is applied to the amplifier section 14 attains such a magnitude DE that the output from section 14 overcomes .5 volt the dead spot on the amplifier-demodulator 30. The amplifier 30 in turn supplies a D.C. output to the lag circuit 31 which lag circuit as stated has a higher time constant than the lag circuit supplied from the control stick signal generator. The output of the lag circuit 31 represented by curve DH slowly builds up and is fed back into the input of amplifier 14. The opposing signal from lag circuit 31 builds up in a negative direction whereas the curve AEG representing the excess signal derived from the control stick signal lag circuit builds up positively.

The phasing in FIGURE 2 while showing the hang-up amplifier feedback as negative merely is to indicate that it is of opposite phase from the excess signal. In other words, if the excess signal is negative, the hang-up amplifier feedback would be positive.

Figure 3:
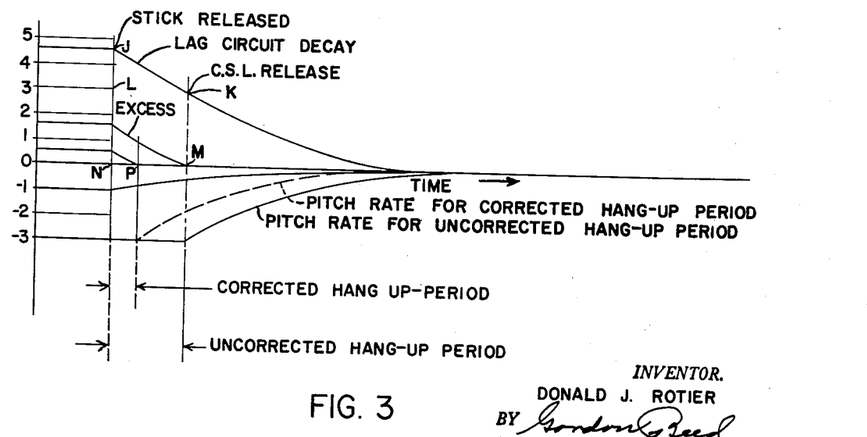

FIGURE 3 shows more fully than FIGURE 2 the system effects of the feedback signal from the amplifier 30. From FIGURE 2 we note that the output of the control stick steering lag circuit attains a maximum of 4.5 volts, for example. The opposing pitch rate signal or limit function in turn attains a maximum set value of −3 volts, for example. The lag circuit signal as well as the pitch rate signal are separately shown in FIGURE 3.

When the pilot releases the force on the control stick at point J, and since he may not realize that the command signal limiter is in control of the servo, he expects the aircraft to immediately respond to his release of the control stick. However the lag circuit although its output now is decreasing nevertheless applies a signal greater than it supplied when the command signal limiter assumed control. Consequently the command signal limiter still maintains control of servo 18.

Ultimately, the output from the control stick lag network decreases to a magnitude MK. When the output from the lag circuit decreases below this magnitude, the command signal limiter returns control of the servo 18 to the discriminator section 15. Thus far in FIGURE 3, the time period L—K between the time of release of the force on the control stick and the resumption of control of the servo 18 by discriminator 15 is termed the command signal limiter hang-up period without considering the effect of amplifier 30 thereon.

The excess lag circuit signal of one and one-half volts for example maximum which is the excess of the control stick signal lag circuit over craft pitch rate is shown as it decays in magnitude upon release of the stick. The opposing feedback signal derived from lag circuit 31 from the output of amplifier 30 is shown as it decays from a maximum value of —1 upon termination of operation of amplifier-demodulator 30. The graph of the curve of the amplifier control signal which is a voltage corresponding to the input to amplifier section 14 is shown as it varies from a maximum value of .5 volt to zero.

Due to the fact that the feedback circuit has a longer time constant, its output decays less rapidly than the output from the lag circuit of control apparatus 10 consequently the magnitude of the amplifier signal of FIGURE 3 reaches zero at a point P prior in time to the point M where M is on the ordinate of K. When the amplifier signal attains a zero value, control of servo 18 is returned to the discriminator section 14 although the input from the control stick lag circuit is greater than MK, the magnitude normally attained when command signal limiting is released. Consequently thereafter, the aircraft will follow the signal from the control stick steering lag circuit. Thus the period of time which must elapse before the operation of servo 18 is compatible with the force exerted by the pilot on the control stick is decreased, and the pitch rate of the craft will begin to decrease at the time indicated by point P of the graph. While the elapse of time N—P in FIGURE 3 is shown somewhat enlarged for purposes of illustration, it is apparent that with the proper time constant assigned to the lag circuit 31 that the period N—P may be reduced to a somewhat negligible amount.

It is also apparent that while the control signal has been described as initiating from operation of the force applied by the pilot of the aircraft to the control stick, the operation is similar when such initiating control signal is derived from an altitude error sensing device, a Mach error sensing device, or similar outer loop control signal source.

Figures 4A, 5:
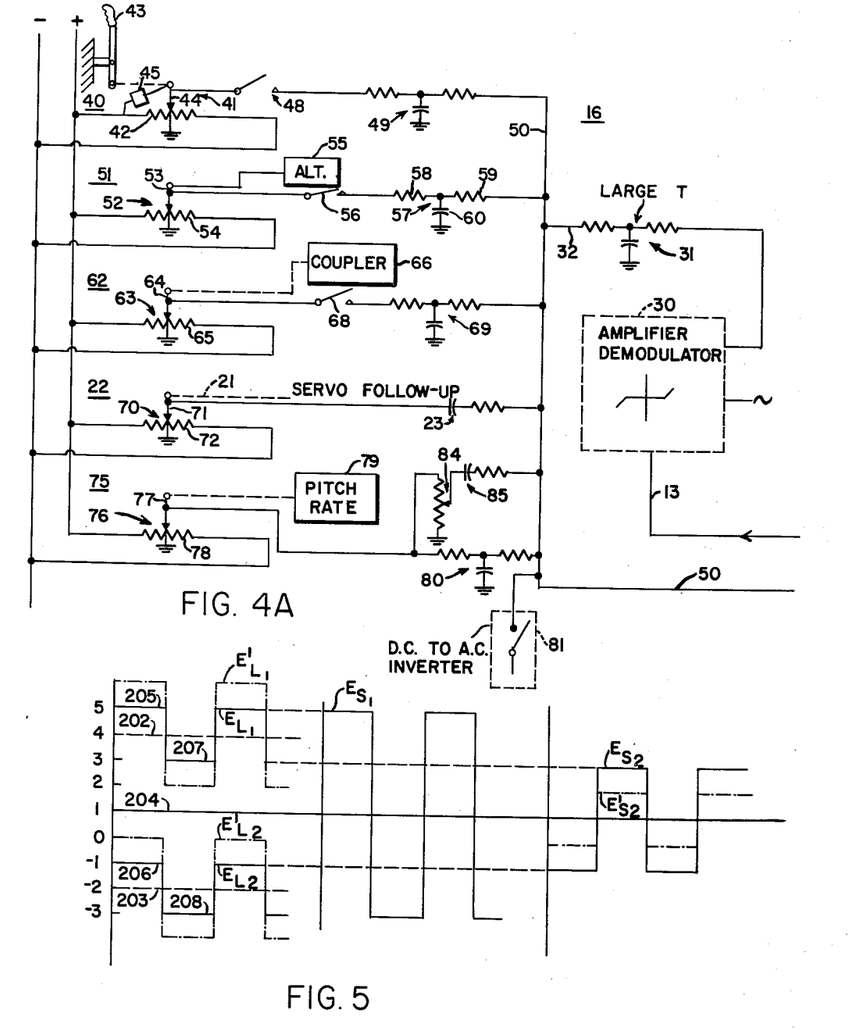
FIGURES 4A and 4B together are a schematic wiring diagram of the control apparatus embodying the present inventive concepts.
FIGURE 5 is a diagram of the relationship of the control signals.
Figure 4B:
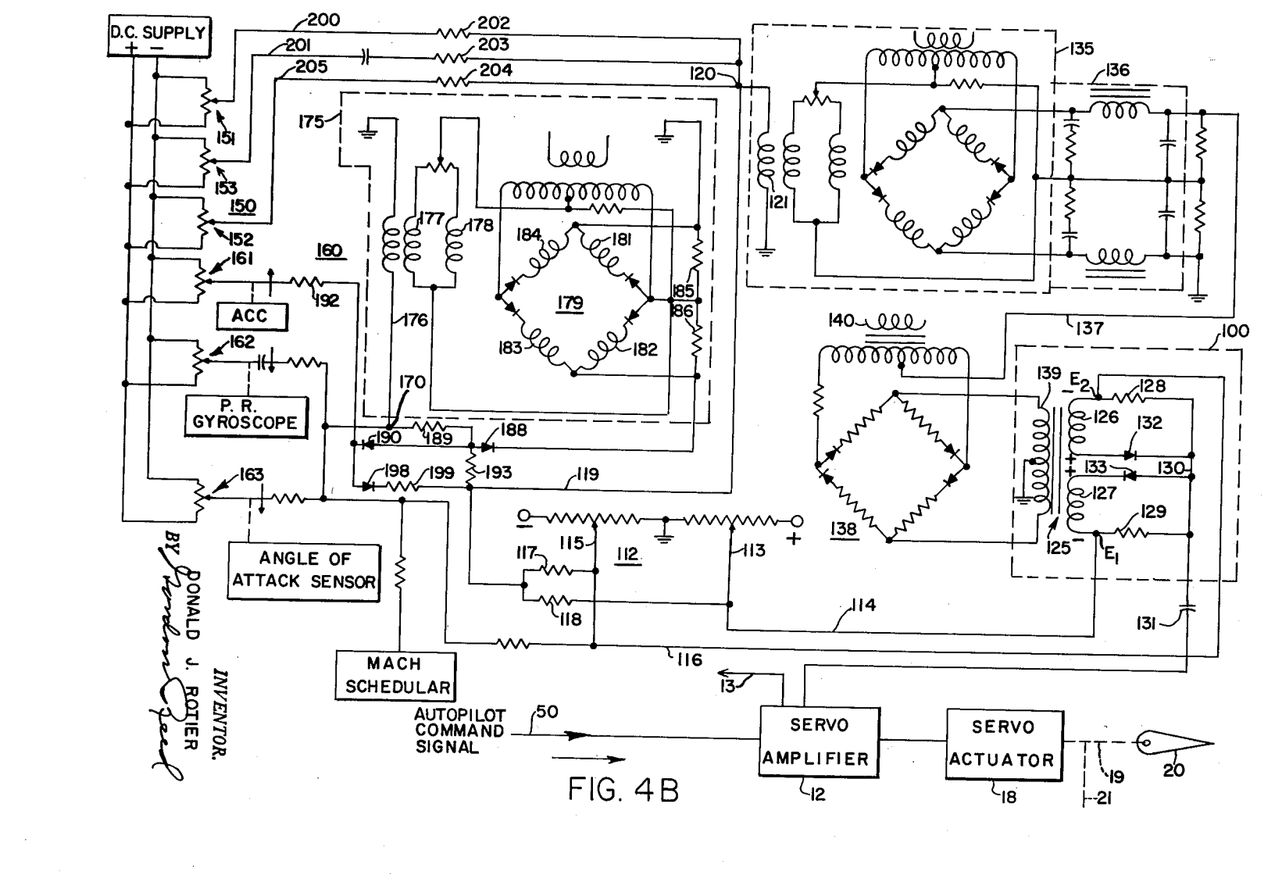

In FIGURES 4A and 4B which show a detailed schematic of the invention, pitch control system 10 of FIGURE 4A corresponds generally to an arrangement shown in a prior application of Benjamin H. Ciscel, Serial No. 65,434, now Patent No. 2,512,413 or Corles M. Perkins, Serial No. 553,131, filed December 14, 1955. Such flight control systems comprise various sources of D.C. control signal voltages of reversible polarity and variable in magnitude. The sources are operated by sensing devices or otherwise, and the D.C. signals are connected through suitable intermediate connecting circuits to a summing conductor wherein the algebraic sum of the various signals is obtained. Such resultant signal is modified by a D.C. to A.C. voltage converter and such A.C. signal voltage is then applied to an amplifier-discriminator whose output controls the operation of a hydraulic actuator.

In FIGURE 4A the various signal sources, for purposes of illustration, are a control stick steering or stick force signal generator 40, an altitude error signal generator 51, an outer loop coupler control signal generator 62, a servo follow up signal generator 22, a craft pitch rate signal generator 75, and a "hang-up" amplifier feedback signal generator 30.

The control stick steering signal generator 40 comprises a potentiometer 41 comprising a resistor 42 and a slider 44. The resistor has its ends connected to positive and negative conductors extending from a D.C. supply. Between the slider 44 and resistor 42 is a stick force transducer 45 similar to the transducer 87, FIGURE 1A of the aforesaid Ciscel application. Slider 44 is operated through the transducer from a conventional control stick 43 of an aircraft operated by the pilot thereof. Resistor 42 includes a grounded center tap and the slider 44 is normally adjacent such point. The direction and magnitude of such electrical signal voltage from potentiometer 41 depends upon direction and magnitude of the force applied by the pilot to the control stick 43. This signal between slider 44 and the center tap of resistor 42 is supplied through a selectively operated switch contact 48 and a lag circuit 49 to a signal summing conductor 50.

Signal generator 51 comprises a potentiometer 52 having a slider 53 and resistor 54. Resistor 54 has a grounded center tap, and its opposite ends are connected to D.C. supply conductors. Slider 53 is displaced in a direction and an amount from the center tap of resistor 54 by an altitude error sensing device 55. The signal from potentiometer 52 therefore varies in accordance with the magnitude and direction of change in altitude of the craft from a desired altitude. The altitude error signal is supplied through selectively closed switch 56 and a lag circuit 57 to summing conductor 50. The lag circuit 57 comprises resistors 58, 59 connected in series between switch 56 and summing conductor 50 and the lag circuit includes a capacitor 60 connected between the junction of resistors 58 and 59 to signal ground, similar to circuits 31, 49, 69, 80.

The signal generator 62 comprises a potentiometer 63 having a slider 64 and a center tapped potentiometer resistor 65 having its ends connected to the positive and negative D.C. supply conductors. Slider 64 is displaced relative to the center tap of resistor 65 by a coupler 66. This coupler 66 may be of the type provided for introducing an outer loop control signal such as a glide path signal or beam signal as in FIGURE 3A of the aforesaid Perkins application. The signal from potentiometer 63 is supplied through a selectively operable switch 68 and interconnecting lag circuit 69 to summing conductor 50.

The signal generator 22 is a servo displacement follow up signal generator comprising a potentiometer 70 having a slider 71 and resistor 72. Resistor 72 has its opposite ends connected to the positive and negative D.C. supply conductors and the resistor includes a center tap to ground. Slider 71 is displaced relative to said center tap by a servo operated follow up member 21, the slider 71 thus being similar to the slider 352 of the aforesaid Perkins application. The output from the potentiometer 70 is applied through a high pass capacitor network 23 to said summing conductor 50.

Signal generator 75 comprises a potentiometer 76 having a slider 77 and resistor 78. Resistor 78 has its opposite ends connected to the positive and negative D.C. supply conductors and the resistor includes a grounded center tap. Slider 77 is displaced relative to the center tap of resistor 78 in accordance with the pitch rate of the aircraft as sensed by a pitch rate sensing device 79. Such sensing device may be a conventional pitch rate gyroscope. The D.C. signal voltage from potentiometer 76 is supplied through lag network 80 to summing conductor 50. The pitch rate signal from potentiometer 76 may also be applied through a voltage dividing potentiometer 84 and high pass pitch rate network 85 to summing conductor 50.

The summing conductor 50 obtains a resultant of the D.C. signal voltages supplied thereto, and such resultant signal is modulated by a D.C. to A.C. inverter 81 and thence applied to the amplifier-discriminator 12.

The amplifier-discriminator 12 in turn reversibly controls the actuator 18 that positions the stabilator surface of the aircraft to control pitch attitude thereof.

As disclosed in my aforesaid application, the control of the servomotor or actuator 18 from the amplifier-discriminator 12 is modified by a command signal limiter arrangement schematically shown in FIGURE 4B and substantially conforming with FIGURE 3 of my prior application. With FIGURE 4B, the limiter is reviewed.

As described in my aforesaid application, a command signal limit function has been predetermined and comprises a summation of signals obtained from various sensing devices of the aircraft such as accelerometers, pitch rate gyroscopes, and angle of attack devices. When the sum of the signals from such sensors attains the limit function value, no further control of the stabilator actuator from the amplifier-discriminator 12 tending to increase such sum is permitted. When the response of the aircraft is such that such sensing elements provide a resultant signal below the limit function value, control of the stabilator actuator 18 is returned to the amplifier-discriminator 12.

As evident from my aforesaid application, and FIGURE 4B herein, the command signal limiter comprises a diode limiter 100 and the operation thereof may be best understood herein by reference to FIGURE 5, which is a graph showing how the various signals are combined and limited by the circuit of diode limiter 100. The limiting action of diode limiter 100 is achieved by combining D.C. signals from a D.C. power supply 112 with the A.C. limit signal received from a transformer 125, and by preventing the autopilot signal received from summing conductor 50 from becoming either more positive or more negative than the established limit function signal.

In order to explain this operation, the D.C. potential picked off power supply 112 by potentiometer wiper 113 and transmitted to the diode limiter over lead 114 will be referred to as $E_1$; the D.C. potential picked off power supply 112 by potentiometer wiper 115 and transmitted to the diode limiter 100 over lead 116 will be referred to as $E_2$; the voltage impressed on secondary windings 126 and 127 of transformer 125, which is the A.C. limit signal received from the command signal limiter, will be referred to as $E_L$; and the input command signal on summing conductor 50 will be referred to as $E_S$.

Since the resistors 128 and 129 are equal in size, that is they have the same resistance, it can be shown that the potential at point 130 of diode limiter 100, caused by the D.C. potentials $E_1$ and $E_2$, is equal to the fraction $$\frac{E_1+E_2}{2}$$

The potential at point 130 would be signal ground potential only if $E_1$ and $E_2$ are equal and opposite, but this is unlikely to occur, since it is usually desirable to provide a higher positive acceleration limit than a negative acceleration limit. Consequently, point 130 is ordinarily biased at a potential above signal ground.

Using a specific example for voltages $E_1$ and $E_2$, if we assume that $E_1$ is $+4$ volts and $E_2$ is $-2$ volts, indicating that the positive acceleration limit set by slider 113 is twice the negative acceleration limit set by wiper 115, the potential at point 130 is $+1$ volt as represented in FIGURE 5 by ordinate 204.

Since the signal voltage $E_S$ is connected in part to the diode limiter at point 130 through the summing conductor 50, and since capacitor 131 which is connected internally in amplifier 12 to conductor 50 is merely a D.C. blocking capacitor, it follows that diode 132 will not conduct until the A.C. voltage $E_S$ causes a negative potential at point 130 that exceeds the D.C. potential at $E_2$; and that diode 133 will only conduct when the potential at point 130 exceeds $E_1$.

Thus it will be noted that diode 133 conducts when the potential at point 130 is in excess of $+4$ volts, and diode 132 conducts when the potential at point 130 is in excess of $-2$ volts. This occurs when the A.C. signal $E_S$ from summing conductor 50, amplifier 12 has a greater excursion, or swing, than $+3$ and $-3$ volts. When this occurs the A.C. signal superimposed on the $+1$ volt D.C. bias at point 130 causes the potential at point 130 to become more positive than $+4$ volts or more negative than $-2$ volts. Diodes 132 or 133 then conduct and shunt to the ground of supply 112 the portion of $E_S$ in effect from conductor 50 that drives point 130 beyond the $+4$ and $-2$ bias voltages $E_1$ and $E_2$ respectively.

The total swing of $E_S$ or the autopilot command signal is thereby limited by said bias voltages $+4$ and $-2$. This relationship is shown in FIGURE 5 where line 202 indicates the D.C. conduction level for diode 133, line 203 indicates the D.C. conduction level for diode 132, and line 204 indicates the D.C. bias potential at point 130 and the center line or zero ordinate upon which $E_S$ is superimposed (not shown).

The D.C. circuitry just described is, of course, unable to provide the desired positive and negative acceleration limits for all flight conditions, since thereby the $E_S$ command signal is merely limited, in either phase, to a voltage swing corresponding to the average of said $E_1$ and $E_2$ bias voltages. This voltage is $\pm 3$ volts in our example. Acceleration limits are the same.

However, a feedback circuit including resistors 117, 118 operates to achieve the desired positive and negative acceleration limits. The feedback circuit causes a bias on the command signal limiter amplifier 135 that is equivalent to the bias maintained at point 130. Summing resistors 117 and 118 are connected to lead 119 and summing point 120 as shown. Resistors 117 and 118 are chosen so that one half of the $E_1$ potential and one half of the $E_2$ potential are summed at point 120. This voltage sum, $+1$, at point 120 causes a current to be produced in winding 121 of amplifier 135 that produces an A.C. bias signal in the transformer windings 126 and 127 equivalent to the $+1$ D.C. bias at point 130. This $+1$ A.C. bias signal, when superimposed on the D.C. bias signals $+4$, $-2$ or $E_1$ and $E_2$, causes $E_1$ to vary as shown in curve $E_{L1}$ and causes $E_2$ to vary as shown in $E_{L2}$ when the craft is in level flight.

With the craft in level flight, a command signal $E_S$ from conductor 50, in phase with said A.C. bias signal in winding 127 and thus opposing it on diode 133 is limited by surve $E_{S1}$; and a command signal on diode 133 from summing conductor 50 out of phase with the A.C. bias signal on winding 127 is limited by curve $E_{S2}$.

Considering both diodes 132, 133, since the in-phase command signal $E_S$ from summing conductor 50 corresponds to a positive acceleration, or craft nose up command, the positive acceleration limit, in view of the $+1$ volt D.C. bias on point 130, by diode 133 is four volts. Since the out-of-phase command signal from conductor 50 corresponds to a craft negative acceleration, or craft nose down command, the negative acceleration limit by diode 132 is $-2$ volts. The desired difference between positive and negative acceleration limits is thereby established.

This feedback arrangement, coupled with the D.C. bias arrangement in diode limiter 100 makes it possible to select a wide variety of positive and negative acceleration limit combinations or limit functions, merely by adjusting the two potentiometer wipers 115, 113, coacting with their respective resistors.

The above discussion has been based on the presumption that the aircraft was in level flight, whereby there was no output signal from bridge circuit 150 comprising the forward accelerometer operated potentiometer 151, the aft accelerometer operated potentiometer 152 and the servo actuator operated potentiometer 153. Neither was there an output signal from the bridge circuit 160 comprising a craft angular accelerometer operated potentiometer 161, a pitch rate gryroscope operated potentiometer 162, and an angle of an attack sensor operated potentiometer 163. Bridge circuits 150 and 160 herein correspond with bridge circuits 101, 206 of my prior application. However, when such a signal from bridge circuits 150 and 160 does exist, such signal is summed at point 120 wtih the feedback signal from resistors 117, 118, and superimposed on the above described limit signal $E_{L1}$ and $E_{L2}$.

When the aircraft is subject to positive acceleration tending to fold the wings up, bridge circuits 150 and 160 which are controlled by the aircraft response supply a resultant signal that is out-of-phase with said A.C. bias signal from resistors 117, 118. On the other hand, negative accelerations of the craft tending to fold the wings down cause a bridge signal from bridge circuits 150, 160 that is in-phase with the A.C. bias signal.

It should be kept in mind that although the signal from bridge circuits 150 and 160 is, for convenience, referred to as an acceleration signal, the actual signal may include angle of attack, stabilator position and pitch rate terms as well.

The effect of a bridge signal from bridge 150 or 160 is illustrated in FIGURE 5, in connection with a craft negative acceleration condition. The negative acceleration condition of the craft causes an output from bridges 150 and 160 that in windings 126, 127 as marked at their ends is in-phase with $E_{L1}$ and $E_{L2}$ being thereby additive therewith. For example, the total ±1 volt swing of $E_{L2}$ is changed to a ±2 volt swing as shown, in curve $E'_{L2}$ (from +6 to +2 volts); and more important the ±1 volt swing of $E_{L2}$ is changed to a ±2 volt swing as shown in curve $E'_{L2}$.

This change in $E_{L1}$ and $E_{L2}$ corresponds to the change in craft acceleration in flight, and indicates in this particular example that the craft is accelerating in a downward direction at an acceleration of approximately one-half of the predetermined limit of −2 units of diode 132 i.e. from +1 to −1 at point 130; and reduces the negative acceleration limit curve $E_{S2}$ to a swing of ± 1 volt as indicated by carve $E_{S2}$ (swing from 0 to +2 volts). When craft negative acceleration increases to the predetermined maximum, curve $E'_{S2}$ becomes colinear with line 204 indicating equal potential on the two sides of diode 132, and any additional negative acceleration command $E_S$ from summing conductor 50 is then shunted to ground since diodes 132 is effectively short-circuited.

In a simiiar manner, the positive acceleration limit of curve $E_{S1}$ is varied by the signals from bridges 150 and 160 of the command signal limiter derived from response of the craft. When the craft moves from level flight to a condition of maximum positive acceleration, the out-of-phase command signal limiter bridge signals in windings 126, 127 cause curves $E_{L1}$ and $E_{L2}$ to become reversed in phase, until peaks 205 and 208 become colinear with line 204 indicating equal potential on the two sides of diode 133, and peaks 206 and 207 reach −5 and +7 volts respectively. Curve $E_{S1}$ then becomes colinear with line 204, and any additional positive acceleration command $E_S$ from summing conductor 50 is shunted to ground through diode 133.

Thus it is seen that diode limiter circuit 100 provides positive and negative limits for an A.C. command signal on summing conductor 50 and thereby prevents the command signal from the autopilot apparatus causing a flight maneuver that would exceed structural, stall or buffet limits of the aircraft. This limit signal varies as the signal at point 120 varies, since the peak-to-peak swing of $E_{L1}$ and $E_{L2}$ is thereby varied. The limited command signal is then transmitted to servo amplifier 12 which controls the servo motor 18 which in turn is operatively connected to the stabilator of the aircraft.

Reverting to bridge 160 as brought out more fully in my prior application, bridge 160 herein which corresponds with bridge 206 therein includes three signal generators, 161, 162 and 163, 161 for generating acceleration signals, 162 for craft pitch rate signals, and 163 for signals corresponding to aircraft angle of attack. A composite signal derived from the accelerometer potentiometer 161, the pitch rate potentiometer 162, and the angle of attack potentiometer 163 is obtained at summing point 170. This composite signal is impressed on control winding 176 of an angle of attack preamplifier 175. The amplifier 175 is a magnetic amplifier and includes in addition to control winding 176, self-biasing windings 177, 178 and load winding bridge 179. The bridge comprises load windings 181, 182, 183, and 184.

Amplifier 175 is arranged so that a positive angle of attack signal, which is indicated to be a positive voltage by the direction of the arrow on potentiometer 163 causes a positive potential at summing point 170 and a negative voltage across amplifier output resistors 185 and 186. This negative output voltage is connected through diode 188 and resistor 189 to control winding 176, thereby providing an inverse feedback signal. Resistor 189 in the feedback of preamplifier 175 is effectively connected between summing point 170 and diode 188 and is designed to reduce the threshold voltage of diode 188 by a factor of the amplifier gain. Diodes 188 and 190 operate to select the greater positive of the angle of attack or acceleration signals.

It should be noted that a positive acceleration of the aircraft causes a negative signal to be impressed upon summing resistor 192, and that a positive angle of attack signal causes a negative potential at the output of magnetic amplifier 175, thereby necessitating the indicated orientation of diodes 190 and 188. If the acceleration signal exceeds the angle of attack signal, diode 190 conducts and diode 188 is cut off, and vice versa, so that only one of these signals is impressed upon the summing resistor 193 and is thereby transmitted over lead 119 to summing point 120.

In the event that a negative aircraft acceleration condition occurs, resulting in a positive signal impressed across resistor 192, diode 198 conducts and this voltage is impressed across summing resistor 199 and over lead 119 to summing point 120.

Acceleration signals are transmitted from signal bridge 150 by way of leads 200 and 205 to summing resistors 202 and 204, respectively and from such resistors to summing point 120. A stabilator position signal is transmitted from bridge 150 by way of lead 201 to a summing resistor 203 and thence to summing point 120. Thus, the signals from leads 119, 201, 200, and 205 are combined at summing point 120, and this composite signal is the input signal for control winding 121 of magnetic amplifier 135.

It should be noted that resistors 202 and 204 have equal ohmic values, thereby causing the linear acceleration terms to cancel. Thus, the signals transmitted over leads 200, 201 and 205 supply angular acceleration and stabilator position terms to summing point 120 but no linear acceleration term.

Magnetic amplifier 135 includes a conventional filter circuit 136 in the output circuit. Consequently, it may be pointed out that an input signal at winding 121 causes a filtered D.C. signal in the output circuit conductor 137. The output signal on lead 137 is supplied to the modulator circuit 138.

Modulator 138 operates to combine the varying D.C. output signals from magnetic amplifier 135 and the A.C. voltage impressed on the modulator from primary winding 140. The center tap output winding 139 of modulator 138, which is the primary winding of transformer 125, receives said varying D.C. voltage from lead 137 modulated by the A.C. voltage of primary winding 140. This resultant signal is then effective to provide positive and negative limit signals in diode limiter circuit 100.

In the arrangement of FIGURES 4A, 4B while the amplifier 12 is a voltage amplifier and discriminator, the hang-up amplifier 30 has an A.C. input amplifier section and a D.C. output from a phase sensitive demodulator section, the output being proportional to the input signal beyond the dead spot.

Operation

The following may be considered an illustration of a type of control provided by a signal generator through a lag circuit when the aircraft is to be controlled in flight from its servomotor 18. The stick force signal generator 40 FIGURE 4A is taken as the control signal source for the servo although similar control may be provided by the altitude error signal generator 51 or the outer loop coupler signal generator 62.

When the pilot applies a force to the control stick 43 and with the switch 48 in closed position the growing output from the lag circuit 49 does not immediately correspond with the magnitude of the signal voltage into the network from potentiometer 41. If sufficient force is applied to the control stick 43, the aircraft response may be such that the limit function previously determined is attained. At this point, no further signal from the lagged network 49 will control the discriminator 15 to operate the servomotor since the command signal limiter shunts any excess command signal from the automatic control system to ground through diodes 132 or 133.

With the pilot still applying a control force to the control stick, the output of the lag circuit 49 increases whereas the operation of the stabilator servomotor or the pitch rate of the craft does not increase because of the command signal limiter control. Consequently the unbalance signal voltage in the summing conductor 50 and a voltage corresponding thereto in the amplifier section 14 may attain such value as to overcome the threshold of the hang-up amplifier 30. The amplifier 30 therefore supplies a feedback signal through its lagged network 31, having a time constant greater than that of lag network 49, to the summing conductor 50. The point at which the hang-up amplifier operation is initiated is obtained on reference to FIGURE 2 showing the curve of the excess signal from the lag circuit over, for example the pitch rate signal, the excess signal ultimately attaining a magnitude causing operation of said amplifier.

The important objective is to reduce the period of time between the release of the force on the control stick by the pilot and the consequent lessening in the output of the stick force potentiometer signal and the resumption of control of the stabilator servomotor from the potentiometer signal on the summing conductor 50. In accordance with the present invention therefore, upon release of the force on the control stick 43, the output from the control stick lag network begins to decrease.

The hang-up amplifier operation is terminated since the control voltage thereto is less than its threshold voltage of operation. In other words, the voltage corresponding to the signal input to the amplifier section decreases below the threshold of the hang-up amplifier.

However, due to the long time constant of the lag circuit 31 associated with the hang-up amplifier, the servo amplifier signal voltage decreases rapidly to zero. The time required for such decrease to zero of the servo amplifier signal voltage being expressed in the period N—P of FIGURE 3.

Since there is therefore no unbalance or resultant voltage on the summing conductor 50, control of the servo stabilator is returned to the sources of signal supplying summing conductor 50. Consequently as the stick force signal continues to decrease, such signal will cause a change in attitude of the aircraft opposite to that occurring upon the initial application of force to the control stick.

It is evident that the time period denoted by the distance N—P is significantly shorter than the period of time denoted by the distance N—M wherein period N—M had been previously required before return of the control of the stabilator servomotor to the signal sources supplying summing conductor 50.

The operation is similar if the initial control signals are, as stated, derived from either the altitude error sensing device or the outer loop coupler operated signal generator. In all cases, the hang-up amplifier supplies the feedback signal to the summing conductor 50 which opposes the initiating signal derived through the particular lag network from which the initiating signal is obtained.

It will now be apparent that there has been provided an improved arrangement for reducing the lag in time between a decrease in an initiating signal and the response of the aircraft to such decrease thereby correcting and reducing the "hang-up" period ordinarily present and that the arrangement not only reduces such time period for control signals derived through a plurality of lagged circuits but that such arrangement is effective irrespective of positive or negative limit functions applied to the aircraft.

What I claim is:

1. In flight control apparatus for an aircraft having a control surface to alter flight conditions comprising: motor means operating said surface; further means controlling said motor means; first command signal providing means including a lag device supplying a signal to said further means to operate said motor means; means including craft flight condition responsive second means supplying a signal opposing the signal from said first command signal providing means; an amplifier having a threshold of operation exceeding the normal difference of the signals from the first and second means; a command signal magnitude limiter responsive to craft flight conditions due to operation of said surface and connected to the further means and preventing additional control of the further means by said first signal providing means to alter operation of said motor means whereby the flight condition attains a maximum value, whereby subsequent increase of said first means signal accompanied by non-increase of the opposing second means signal develops a resultant signal exceeding the threshold of operation of said amplifier; and a balancing signal means controlled by the amplifier and opposing the difference of the first and second means signals.

2. Flight control apparatus for an aircraft having an elevator control surface comprising: motor means operating said surface; control means operating said motor means; first control signal providing means; a passive lag device interconnecting said first signal providing means and control means; craft flight condition responsive second signal providing means supplying a signal to said control means opposing the signal from said lag device; an amplifier connected to the control means and having a threshold of operation exceeding the normal difference of said opposing signals on the control means; a command signal magnitude limiter responsive to craft flight connected to the control means and preventing the first signal as lagged from additionally controlling the control means, whereby increase of the signal from said lag device with non-increase of the signal from the second means, during such prevention, develops a resultant signal exceeding the threshold of operation of said amplifier; and rebalancing signal means controlled by the amplifier and connected to the control means and opposing the difference in signals from the lag device and second means.

3. In flight control apparatus for an aircraft having a control surface comprising: motor means operating said surface; further means controlling said motor means; first and second means each including a lag device alternatively supplying a command control signal to said further means; craft flight condition responsive means sensing a condition due to operation of said surface applying a third signal opposing the signal from said first or second means; an amplifier connected to the further means and having a threshold of operation exceeding the normal difference derived from said opposing signals; a command signal magnitude limiter responsive to craft flight conditions connected to the further means and limiting the magnitude of the command signal and preventing additional control of said further means by said difference, whereby increase of the output of the selected alternative lag device with non-increase of the third signal during such prevention develops a resultant signal exceeding the threshold of operation of said amplifier; and means including a lag device responsive to said amplifier and opposing said difference.

4. In an automatic condition control apparatus for a mobile craft having a movable control surface, a servomotor adapted to operate said surface; signal responsive means connected to said motor; manually operable means; a lag device intermediate the manually operable means and responsive means supplying a signal delayed in time to said responsive means; means operable by said motor for developing a second signal and connected to said responsive means; means responsive to a predetermined value of a condition of said craft preventing further operation of said motor by said manual means; and means responsive to a predetermined differential signal in said signal responsive means supplying a further signal opposing said differential signal.

5. In flight control apparatus for an aircraft having attitude changing means, in combination: motor means operating said attitude changing means; an electronic amplifier controlling said motor means; first command signal providing means including a lag device supplying a first signal to said amplifier; craft flight condition responsive second means supplying a second signal to said amplifier opposing said first signal; means including a second amplifier having a selected threshold of operation exceeding a normal difference of said two signals and connected for control thereof to said first amplifier; a command signal limiter responsive to a limit function based on craft flight conditions affected by operation of said attitude changing means connected to said first amplifier to prevent change in operation thereof by said first signal to prevent flight conditions exceeding the limit function, whereby an increase of said first signal accompanied by non-increase of said second signal causes operation of said second amplifier to supply a feedback signal to said first amplifier opposing said first signal to balance the input of said first amplifier.

6. In flight control apparatus for an aircraft having attitude changing means for altering the attitude of the craft, in combination: positionable means whereby said attitude changing means may be operated; an electronic amplifier controlling said positionable means; first D.C. command signal providing means including a resistor-capacitor lag device supplying a first signal with a phase lag to said amplifier; craft flight condition responsive second means supplying a second D.C. signal to said amplifier opposing said first signal as lagged; a second amplifier having a D.C. output controlled from said first amplifier; a second resistor-capacitor lag device connecting the output of the second amplifier to the first amplifier for control thereof; a command signal magnitude limiter responsive to craft flight affected by operation of said attitude changing means and connected to said first amplifier to prevent further effective operation thereof by said first signal to alter operation of said positionable means, whereby increase of said first signal as lagged accompanied by non-increase of said second signal causes operation of said second amplifier to supply a feedback signal through said second lag device to said first amplifier opposing said first signal as lagged, said second resistor-capacitor lag device having a time constant greater than the first lag device to enable reduction in said first signal to be accompanied substantially in point of time by decrease in said second signal.

7. In flight control apparatus for an aircraft having attitude changing means, in combination: motor means operating said attitude changing means; an electronic amplifier controlling said motor; first means providing a first signal; a lag device controlled by said first signal and supplying a second signal to said amplifier at a phase lagging said first signal; craft flight condition responsive means supplying a third signal to said amplifier opposing said second signal; a second amplifier connected to said first amplifier and having a threshold of operation voltage exceeding that corresponding to the normal difference of said second and third signal voltages; a second lag network having a time constant greater than said first network connecting the second amplifier to the first amplifier to supply a feedback fourth voltage; a command signal magnitude limiter responsive to craft flight affected by operation of said attitude changing means connected to said first amplifier to prevent further operation thereof by said second signal, whereby increase of said second signal accompanied by non-increase of said third signal causes operation of said second amplifier to supply a feedback signal to decrease the unbalance signal on said first amplifier so that reduction in magnitude of said first signal is accompanied substantially in point of time by reduction in said third signal.

8. In flight control apparatus for an aircraft having an elevator control surface comprising: motor means operating said surface; further means comprising an A.C. amplifier-discriminator controlling said motor means; first signal providing means; a lag device interconnecting said first signal providing means and further means; craft flight condition responsive second signal providing means supplying a signal to said further means opposing that from said lag device; an amplifier-demodulator connected to the A.C. amplifier of the further means and having a threshold of operation exceeding the normal difference of said opposing signals; a monitoring means responsive to a condition of craft flight caused by operation of said surface and connected to the further means and preventing the first signal providing means from effectively additionally controlling the further means thus preventing change in operation of said motor means, whereby increase of the signal from said lag device with non-increase of the signal from the second signal providing means during said prevention develops a resultant signal exceeding the threshold of operation of said amplifier-demodulator; and rebalancing signal providing means controlled by the amplifier-demodulator and opposing the difference in signals from the lag device and second signal providing means.

9. In an automatic flight control apparatus for a dirigible craft having a movable control surface, in combination: a servomotor adapted to operate said control surface; voltage signal responsive means connected to said servomotor for operation thereof; operable means including a lag device supplying a first signal to said signal responsive means; signal generating means operated by said servomotor for developing a second signal and connected to said responsive means and opposing said first signal; monitoring means responsive to a predetermined magnitude of a condition of said craft caused by operation of said surface and preventing further operation of said servomotor by said operable means; and rebalancing means responsive to a predetermined differential signal on said signal responsive means supplying a further signal to said responsive means opposing said differential signal.

10. In an automatic control apparatus for a dirigible craft having a movable control surface, in combination: a responsive servomotor means adapted to operate said surface; A.C. voltage signal responsive means connected to said servomotor for control thereof; a D.C. signal voltage summing network; manually operable means including a resistor-capacitor lag device supplying a first signal to said summing network; signal generating means operable by said motor for developing a second D.C. signal and connected to said summing network; means including a D.C. to A.C. voltage converter connecting said summing means and A.C. voltage responsive means; monitoring means responsive to a predetermined value of a flight condition of said craft caused by operation of said surface and connected to said A.C. voltage responsive means and preventing further operation of said servomotor by said voltage responsive means; and means responsive to a predetermined differential signal in said summing network supplying a further signal thereto opposing said differential signal.

11. In an automatic condition control apparatus in combination: a servomotor adapted to operate a condition controlling device; signal voltage responsive means connected to said motor for operation thereof; manually operable signal voltage providing means including a lag device applying a signal to said responsive means; voltage generating means operable by said motor for developing a second signal and connected in opposing relation with said first signal in said responsive means; further means responsive to a predetermined rate of change of the condition preventing further operation of said device by said operable means; and means including a lag device responsive to a predetermined differential signal between said first and second signal providing means supplying a further signal opposing said differential signal, said second lag device having a time constant greater than that of the first recited lag device.

12. In control apparatus for a mobile craft having attitude changing means, in combination: motor means operating said attitude changing means; an electronic amplifier-discriminator controlling said motor means; a first D.C. signal voltage providing means; a resistor-capacitor lag device controlled by said first signal and supplying a second signal to said amplifier, the magnitude of said second signal lagging in phase that of said first signal; craft condition responsive means supplying a third D.C. signal to said amplifier opposing said second signal; a second amplifier connected to said first amplifier and having a threshold of operation voltage exceeding that corresponding to the normal difference of said second and third voltages; a second resistor-capacitor lag network having a time constant greater than said first network time constant and connecting the second amplifier to the first amplifier to supply a feedback fourth voltage; a command signal limiter responsive to craft flight conditions affected by operation of said attitude changing means and connected to said first amplifier to prevent further effective operation thereof by said second signal, whereby increase of said second signal thereafter accompanied by non-increase of said third signal causes operation of said second amplifier to supply a feedback signal to decrease the unbalance signal on said first amplifier.

13. In flight control apparatus for an aircraft having a control surface to alter flight conditions comprising: motor means operating said surface, further means controlling said motor means; first command signal providing means including a lag device supplying a signal to said further means to operate said motor means; means including craft flight condition responsive second means supplying a signal opposing the signal from said first command signal providing means; a third signal providing means having a threshold of operation exceeding the normal difference of the signals from the first and second means; a command signal magnitude limiter responsive to craft flight conditions due to operation of said surface and connected to the further means and preventing additional control of the further means by said first signal providing means whereby craft flight condition attains a maximum value so that subsequent increase of said first means signal accompanied by non-increase of the opposing second means signal develops a resultant signal exceeding the threshold of operation of said third signal supplying means, said third signal opposing the difference of the first and second means signals.

14. In flight control apparatus for an aircraft having a control surface to alter flight conditions, comprising: motor means operating said surface; control means operating said motor means; command signal providing means including a lag device supplying a first signal to said control means; means including craft flight condition responsive means supplying a second signal opposing the first signal; a third signal providing means responsive to said control means but having a threshold of operation exceeding the normal difference of the first and second signals; a command signal magnitude limiter responsive to craft flight condition due to operation of said surface and connected to the control means and preventing alteration in further control of the motor means by said control means whereby the flight condition attains a maximum value, whereby subsequent increase of said first signal accompanied by non-increase of the opposing second signal develops a resultant signal that operates the third signal providing means, said third signal opposing the difference of the first and second signals.

15. In flight control apparatus for an aircraft having attitude changing means and a servomotor adapted to operate said attitude changing means in combination: signal responsive means connected to operate said motor; a first source of control signal; means comprising a lag device for supplying the signal from said source to said responsive means in a delayed manner to provide a delayed signal thereto; means responsive to a predetermined value of a condition of said craft preventing further operation of said motor means by said delayed signal; and further means responsive to further increase in said delayed signal to said signal responsive means supplying an additional signal opposing said delayed signal.

16. The apparatus of claim 15 wherein said additional signal from the further means passes through a second lag or delaying device before opposing the output of the first lag device.

17. The apparatus of claim 16 wherein the second lag device has a higher time constant than the first lag device.

References Cited in the file of this patent

UNITED STATES PATENTS

| | | |
|---|---|---|
| 2,936,136 | Jofeh | May 10, 1960 |
| 2,977,070 | Burner | Mar. 28, 1961 |